(12) United States Patent
Mani (10) Patent No.: US 6,744,868 B2
(45) Date of Patent: Jun. 1, 2004

(54) CALL PARTY PROFILE PRESENTATION SERVICE IN A MULTIMEDIA-CAPABLE NETWORK

(75) Inventor: Babu V. Mani, Plano, TX (US)

(73) Assignee: Alcatel, Paris (FR)

( * ) Notice: Subject to any disclaimer, the term of this patent is extended or adjusted under 35 U.S.C. 154(b) by 531 days.

(21) Appl. No.: 09/871,410

(22) Filed: May 31, 2001

(65) Prior Publication Data

US 2002/0181683 A1 Dec. 5, 2002

(51) Int. Cl.$^7$ ................................................ H04M 3/42
(52) U.S. Cl. .............................. 379/201.02; 379/201.05
(58) Field of Search ....................... 379/201.01, 201.02, 379/201.04, 201.05, 196, 199, 201.11, 201.12, 210.02, 210.03, 142.05, 142.06

(56) References Cited

U.S. PATENT DOCUMENTS

| | | |
|---|---|---|
| 4,991,205 A | 2/1991 | Lemelson |
| 4,993,068 A | 2/1991 | Piosenka et al. |
| 5,229,764 A | 7/1993 | Matchett et al. |
| 5,703,934 A | 12/1997 | Zicker et al. .................. 379/61 |
| 5,771,283 A | 6/1998 | Chang et al. ................ 379/142 |
| 5,787,159 A | 7/1998 | Hamilton et al. ........... 379/201 |
| 5,796,810 A | 8/1998 | Lim et al. .................... 379/142 |
| 5,836,009 A | 11/1998 | Diamond et al. ........ 379/93.23 |
| 5,864,612 A | 1/1999 | Strauss et al. ............... 379/142 |
| 5,896,444 A | 4/1999 | Perlman et al. .......... 379/93.35 |
| 5,903,636 A | 5/1999 | Malik .......................... 379/142 |
| 5,907,604 A | 5/1999 | Hsu ............................. 379/142 |
| 5,940,799 A | 8/1999 | Bruckert et al. |
| 6,009,158 A | 12/1999 | Romero ...................... 379/209 |
| 6,038,305 A | 3/2000 | McAllister et al. ......... 379/207 |
| 6,067,349 A | 5/2000 | Suder et al. ............. 379/88.19 |
| 6,167,116 A | 12/2000 | Freadman ................ 379/88.01 |
| 6,167,517 A | 12/2000 | Gilchrist et al. |
| 6,665,389 B1 * | 12/2003 | Haste, III ................... 379/196 |
| 2002/0106066 A1 * | 8/2002 | Swanson et al. ............ 379/196 |

FOREIGN PATENT DOCUMENTS

| | | |
|---|---|---|
| EP | 1176493 A | 1/2002 |
| WO | WO-9900719 A | 1/1999 |

OTHER PUBLICATIONS

Labuschagne L, et al., "Improved System–Access Control Using Complementary Technologies", Computers & Security, International Journal Devoted to the Study of Technical and Financial Aspects of Computer Security, Elsevier Science Publishers, Amsterdam, NL., vol. 16, No. 6, 1997, pp. 543–549.

Gary Rogers, Sonus Networks; "Softswitching is the architecture for the new public network"; Feb. 19, 2001; pp. 1–4.

"Class–Independent Switching"; Tellabs; Oct. 12, 2000; pp. 1–10 (+ cover).

(List continued on next page.)

*Primary Examiner*—Benny Tieu
(74) *Attorney, Agent, or Firm*—Danamraj & Youst, P.C.; Craig A. Hoersten; V. Lawrence Sewell (57) ABSTRACT

A call party profile presentation system and method for use in a multimedia-capable network for delivering a party's presentation profile to a subscriber at call setup or during the call in order to uniquely identify the party. A multimedia session engine is operable to launch a call treatment application for the subscriber with respect to a call between a call party and the subscriber. Logic associated with the call treatment application determines an appropriate portion of the call party's presentation profile to be provided to the subscriber based on subscriber selection, call party presentation restrictions, or both. A multimedia interface operable with the subscriber's terminal is actuated for delivering an indicium associated with the selected portion of the call party's presentation profile to the subscriber.

22 Claims, 9 Drawing Sheets

OTHER PUBLICATIONS

Janet R. Dianda, Raymond O. Colbert, Philippe J.L. Herve and Tongzeng Yang; "Programmable Service Platforms for Converged Voice/Data Services"; Bell Labs Technical Journal (Jul.–Sep. 2000); Aug. 2000; pp. 43–58.

"SALIX® 7620 Softswitch"; Tellabs; Jul. 2000; 4 pages.

Doug Allen; "Softswitch Fever: The Bedrock for Next–Gen Services"; Telecommunications®; Jan. 2000; pp. 1–7.

"CommWorks Multiservice Architecture"; http://www.3com.com/technology/tech_net/white_papers/503087a. html; pp. 1–10.

"Carrier–Class Features and Components"; http://192.156.136.22/products/dsheets/400595a.html; pp. 1–3.

* cited by examiner

| | NAME ID | TELE. # | STORED PICTURE OR IMAGE | LIVE PICTURE OR IMAGE | VIDEO | AUDIO | SCHEDULING OPTIONS | RESTRICTION OPTIONS |
|---|---|---|---|---|---|---|---|---|
| SUBSCRIBER-1 | | | | | | | | |
| SUBSCRIBER-2 | | | | | | | | |
| ⋮ | | | | | | | | |
| SUBSCRIBER-N | | | | | | | | |

CALL PARTY PROFILE PRESENTATION SERVICE IN A MULTIMEDIA-CAPABLE NETWORK

CROSS-REFERENCE TO RELATED APPLICATION(S)

This application discloses subject matter related to the subject matter disclosed in the following commonly owned co-pending patent application(s): (i) "User Verification Service In A Multimedia-Capable Network," filed May 31, 2001, Ser. No. 09/871510 in the name(s) of: Babu V. Mani; (ii) "Direct Connect Service In A Multimedia-Capable Network," filed May 31, 2001, Ser. No. 09/871,514, in the name(s) of: Babu V. Mani; (iii) "Distinctive Call Notification Service In A Multimedia-Capable Network," filed May 31, 2001, Ser. No. 09/871,079, in the name(s) of: Babu V. Mani; (iv) "Emergency Notification And Override Service In A Multimedia-Capable Network," filed May 31, 2001, Ser. No. 09/871,515, in the name(s) of: Babu V. Mani; and (v) "Call Waiting Service In A Multimedia-Capable Network," filed May 31, 2001, Ser. No. 09/871,042 in the name(s) of: Babu V. Mani, which are hereby incorporated by reference for all purposes.

The subject matter of the present patent application is also related to the subject matter disclosed in the following commonly owned co-pending patent application(s): (i) "Personalized Calling Party ID Display Service," filed May 31, 2001, Ser. No. 09/871,289, in the name(s) of: Babu V. Mani.

BACKGROUND OF THE INVENTION

1. Technical Field of the Invention

The present invention generally relates to telecommunication and data communication services. More particularly, and not by way of any limitation, the present invention is directed to a call party profile presentation service in a multimedia-capable next-generation network.

2. Description of Related Art

Over the last two decades or so, telecommunication services have evolved rapidly from simple telephone calls and fax communications to a host of advanced services such as multi-party conferences, voice mail, call forwarding, caller ID, call waiting, et cetera. This rapid evolution has been made possible primarily due to the successful deployment of the Intelligent Network (IN) and Advanced IN (AIN) architecture using Signaling System No. 7 (SS7) as the out-of-band signaling protocol infrastructure. Similarly, data services have also followed a significant transformation from basic text messaging in the 1980s to the World Wide Web and Internet of today, where transporting diverse media has become commonplace. For example, bandwidth-intensive services such as desktop video conferencing, video on demand, telemedicine, real-time audio, and many other applications are driving the demand for simultaneous support of different types of services on the same public network.

Coupled with the phenomenal popularity of the Internet, recently there has been a tremendous interest in using the packet-switched network (PSN) infrastructure employed in the data networks (e.g., those based on Internet Protocol (IP) addressing) as a replacement for, and/or as an adjunct to, the existing circuit-switched network (CSN) infrastructure deployed in today's voice networks. Several advantages are expected to be realized due to such integration. From network operators' viewpoint, the inherent traffic aggregation in PSN allows for a reduction in the cost of transmission and the infrastructure cost per end-user. Ultimately, such cost reductions enable the network operators to pass on the savings to subscribers or, more generally, users. Also, operators of a new breed of service-centric networks (referred to as next-generation networks, distinct from the existing voice-centric and data-centric networks) can offer enhanced services with integrated voice/data/video to users who will be using endpoints of diverse multimedia capabilities.

As alluded to hereinabove, several advances have taken place in both data and voice services. However, the current data-centric and voice-centric services do not provide the gamut of enhancements that are possible with the use of multimedia capabilities in a next-generation network.

SUMMARY OF THE INVENTION

Accordingly, the present invention advantageously provides an enhanced call party profile presentation service in a multimedia-capable network wherein the identity of a call party, i.e., either a called party or a calling party, can be presented to a subscriber via one or more multiple formats, including pictures, audio/video clips, graphic images, and the like. Preferably, the multimedia-capable network is provisioned as a next-generation network having a decoupled service architecture that is facilitated by the use of multimedia softswitch technology.

In one aspect, the present invention is directed to a system and method for delivering a party's presentation profile to a subscriber at call setup or during the call in order to uniquely identify the party. A multimedia session engine is operable to launch a call treatment application for the subscriber with respect to a call between a call party and the subscriber. Service logic associated with the call treatment application determines an appropriate portion of the call party's presentation profile to be provided to the subscriber based on subscriber selection, call party presentation profile restrictions, or both. Preferably, a database populated with the presentation profiles is provided that can be queried by the service logic. A multimedia interface operable with the subscriber's terminal is actuated for delivering an indicium, e.g., name, picture, audio or video clips, etc., associated with the selected portion of the call party's presentation profile to the subscriber. In additional exemplary embodiments, the indicia may also include the call party's nickname, age group, gender, languages spoken, hobbies, and the like, which can be selectively presented based on the context, e.g., shopping, leisure, research, insurance quotes, and so on.

Where the call party profile refers to the profile of a calling party, it can be a default profile maintained by the network, or one selected by the calling subscriber, or one selected by a party who is authorized to make a call. Similarly, where the call party profile refers to the profile of a called party, it can be a default profile maintained by the network, or one selected by the called subscriber, or one selected by a party authorized to answer the call.

Depending on how the service architecture is implemented, the call treatment application may be provisioned as a service application hosted on a third-party server platform coupled to a public packet-switched network (e.g., the Internet), as a telecom-hardened, carrier-class service application hosted on dedicated IN/AIN-compliant nodes such as multimedia Service Control Points (SCPs) and application servers, or as a centralized service with service logic embedded in SS7 nodes (e.g., Service Switching Points or SSPs) and multimedia softswtich elements.

In one exemplary embodiment, the call party profile presentation scheme of the present invention is operable to effectuate a profile request by the call party in order to obtain a portion of the subscriber's presentation profile. Responsive thereto, a multimedia interface operable with the call party's terminal is actuated for delivering the subscriber's profile to the call party.

In another aspect, the present invention is directed to a computer-accessible medium operable with at least a network element disposed in a multimedia-capable next-generation network. The computer-accessible medium is further operable to carry a sequence of instructions which, when executed by at least one processing entity associated with the network, cause to be performed at least a portion of the steps of the multimedia-capable call party profile presentation method set forth hereinabove.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
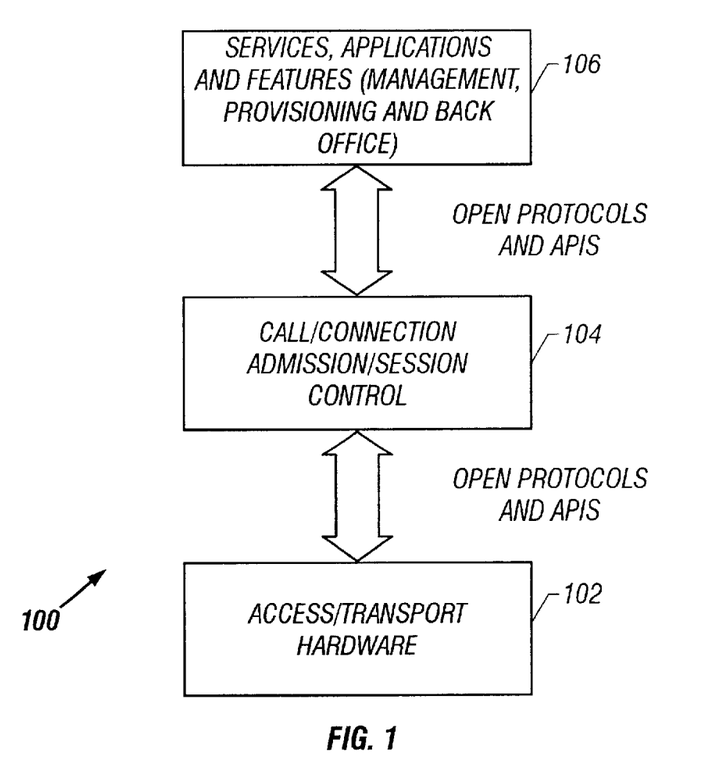
FIG. 1 depicts an exemplary high-level architectural scheme of a next-generation, multimedia-capable network employed for practicing the teachings of the present invention.

In the drawings, like or similar elements are designated with identical reference numerals throughout the several views thereof, and the various elements depicted are not necessarily drawn to scale. Referring now to FIG. 1, depicted therein is an exemplary high-level architectural scheme 100 of a next-generation network that is capable of effectuating multimedia communications. In the context of the present patent application, the term "multimedia" broadly refers to visual information, aural information, and other information. Visual information is generally divided into two categories: (i) still pictures and graphics, and (ii) full-motion video or animation. Aural information includes both speech and non-speech categories. Other information categories can include text, computer data, etc. Multimedia communication involves, accordingly, integrated presentation of text, graphics, video, animation, sound, and the like, using different media and multiple information elements in a single application or session.

The exemplary architectural scheme 100 of the next-generation network is preferably effectuated by implementing what is known as softswitch technology. Essentially, the softswitch functionality is operable to separate the call control functions of a call (or, "session control" functions in the context of a multimedia communication session) from the media gateways (i.e., transport layer(s)) that carry it. Call control features can vary, but call routing, admission control, connection control (such as creating and tearing down sessions), and signaling interworking—such as from SS7 to Session Initiation Protocol (SIP)—are usually included. These functionalities may collectively be referred to as session control. The softswitch functionality can also include: (i) the ability to route a call based on customer database information, (ii) the ability to transfer control of the call to a node disposed in another network, and (iii) support of management functions such as provisioning, billing, etc.

Continuing to refer to FIG. 1, the architectural scheme 100 accordingly includes an access/transport level 102 which interacts with a session control level 104 via a plurality of open-standard protocols and application programming interfaces (APIs). The session control level 104 is operable, in turn, to interface with an application services/features level 106 via a second set of open-standard protocols and APIs. As will be described in greater detail hereinbelow, various multimedia services, applications, and features may be provided as part of this services level 106. Also, some of the back office management and provisioning functionality can be included herewith.

Those skilled in the art should readily appreciate that several protocols and APIs are available for effectuating the architectural scheme 100 set forth hereinabove, which effectively decouples the session control layer from the underlying access/transport layer as well as the service application layer. For example, these protocols—which effectuate media control APIs, signaling APIs, and service APIs—include: SIP, H.323, Call Processing Language (CPL), Media Gateway Controller Protocol (MGCP), Internet Protocol Device Control (IPDC), H.248, MEGACO, Real-Time Protocol (RTP), Java™ APIs for Integrated Networks (JAIN), Resource Reservation Protocol (RSVP), Parlay, Lightweight Directory Access Protocol (LDAP), Markup Languages such as Extensible Markup Language (XML), Multi Protocol Label Switching (MPLS), and the like. Additionally, access to the existing IN/AIN service architecture is also available via suitable SS7 or IP-based interfaces.

The softswitch functionality is realized essentially as a software implementation that can reside on a single network element, or be distributed across multiple nodes. Also, different levels of decoupling and interfacing may be provided in an actual softswitch implementation. For example, SS7 functionality may be embedded within a softswitch element or kept separate. In other implementations, the softswitch functionality may sit on top of a media gateway (MGW), instead of being physically distinct, as long as transport and control planes are decoupled.

By creating separate planes for control and switching and leveraging software's programmability, service providers can combine transport services and control protocols freely in order to facilitate seamless migration from one service to another. Best-in-class solutions and products from multiple vendors can be advantageously deployed in the next-generation network because of open standards and APIs. Further, open APIs to the service layer (including a suitable service creation environment (SCE)), along with service creation, service mediation and service brokering standards, enable creation of numerous advanced, multimedia-enhanced services with faster service rollout.

Figure 2:
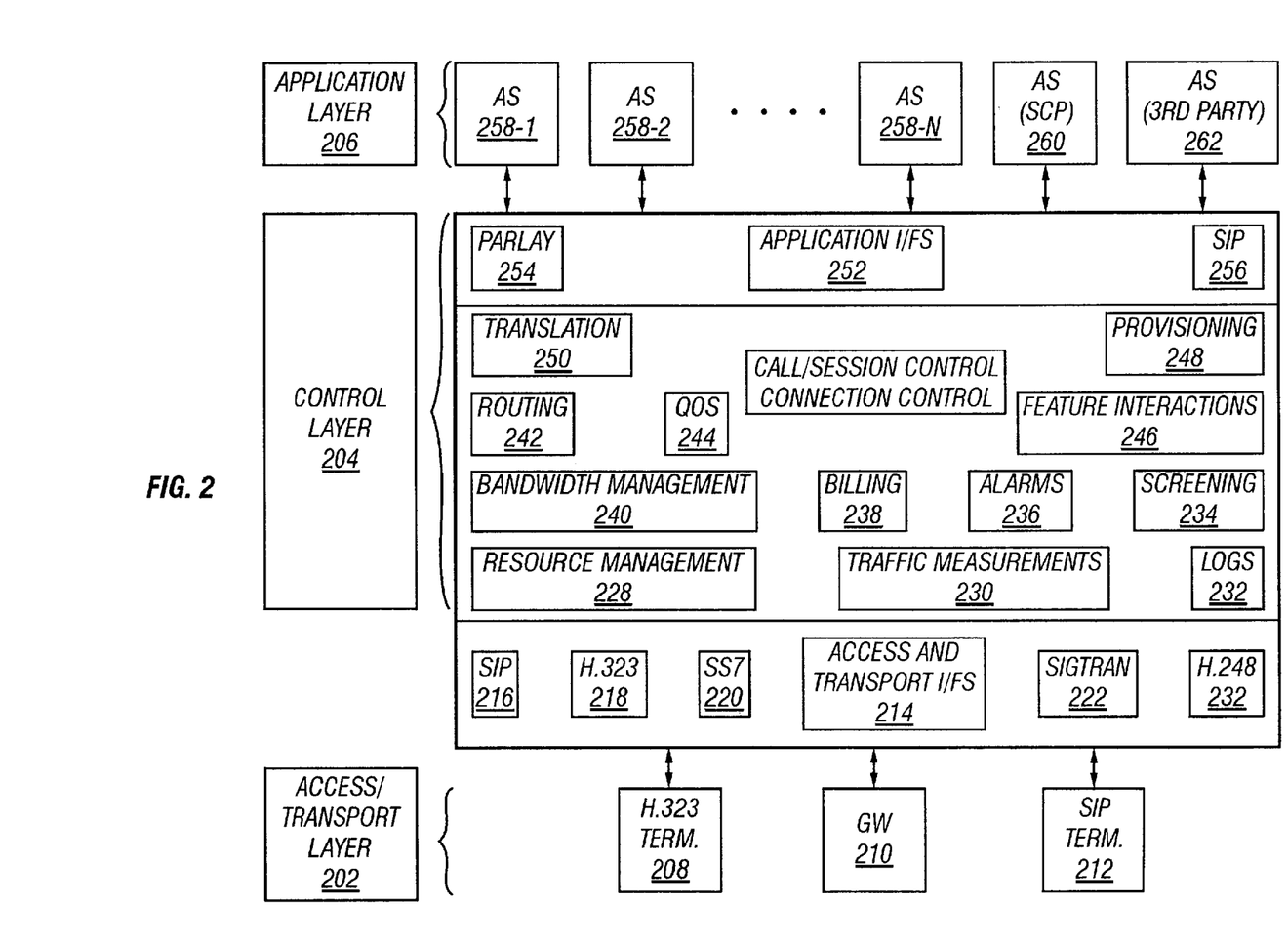
FIG. 2 depicts a functional block diagram associated with the exemplary high-level architectural scheme shown in FIG. 1.

FIG. 2 depicts a functional block diagram associated with the exemplary architectural scheme shown in FIG. 1. Three layers corresponding to the three decoupled levels of the architectural scheme are particularly illustrated. An access/transport layer 202 is exemplified with a plurality of multimedia-capable H.323 terminals 208, GWs 210 (including MGWs and Access Gateways or AGWs) for providing access to one or more Integrated Access Devices (IADs) (not shown) and other communication appliances, and multimedia-capable SIP terminals 212. For purposes of the present invention, all such multimedia-capable access devices (including multimedia-capable phones, computers, game stations, television sets, etc.) may be referred to as multimedia appliances and are preferably provided with one or more man/machine interfaces (e.g., video/still cameras, microphones, display screens, keyboards, pointing devices, joy sticks, track balls, voice recorders, audio-to-text or text-to-audio converters, and the like) for accepting or capturing multimedia responses or inputs associated with a user. Also, in some exemplary implementations, the multimedia appliances may be equipped with suitable biometric ID readers and sensors, e.g., fingerprint readers, retinal scanners, voice recognition systems, etc.

Continuing to refer to FIG. 2, control layer 204 of the decoupled architectural scheme illustrates the functionality of an exemplary multimedia call/session engine implemented as part of a multimedia softswitch in a network. A call/session and connection control block 226 is provided with a plurality of access and transport interfaces 214 to couple to the underlying access/transport layer 202. As alluded to hereinabove, these interfaces include, e.g., SIP interfaces 216, H.323 interfaces 218, SS7 interfaces 220, SigTran interfaces 222 (for SS7-over-IP) and H.248 interfaces 224. The functionality of the call/session and connection control block 226 is associated with a plurality of modules such as, for instance, a resource management module 228, a traffic metering/measurement module 230, an event log module 232, a screening module 234, alarms 236, a billing module 238, a bandwidth management module 240, a routing module 242, a Quality of Service (QoS) module 244, feature interactions module 246, a provisioning module 248, and a translation module 250.

A plurality of application interfaces 252 are available to the multimedia session engine for interacting with an application layer 206. A Parlay interface 254 and a SIP interface 256 are exemplified herein. Reference numerals 258-1 through 258-N refer to a plurality of application servers (ASs) that are operable to host various services, features and management policies. One or more legacy service nodes (e.g., a Service Control Point or SCP) may also be provided as part of the application layer 206 in the form of one or several AS nodes, e.g., AS 260. Preferably, interfaces to third-party AS nodes 262 are also included.

Application layering in the decoupled architectural scheme can be architected in three ways. Custom applications such as e-commerce, e-business, e-residence (home appliance control, residential security, etc.), e-health, and the like, may reside on the Internet as applications hosted on third-party platforms. Specialized services such as Virtual Private Networks (VPNs), prepaid services, etc., and multimedia applications for business and residential use may be provided as distributed applications hosted on dedicated telecom-hardened platforms. Carrier-class AS nodes, multimedia-capable SCPs, etc. typically comprise such platforms. A select group of legacy service offerings, for commercial as well as residential applications, may be provided as centralized applications that are based on SS7 platforms (such as signal switching points (SSPs) and softswitch nodes.

Figure 3:
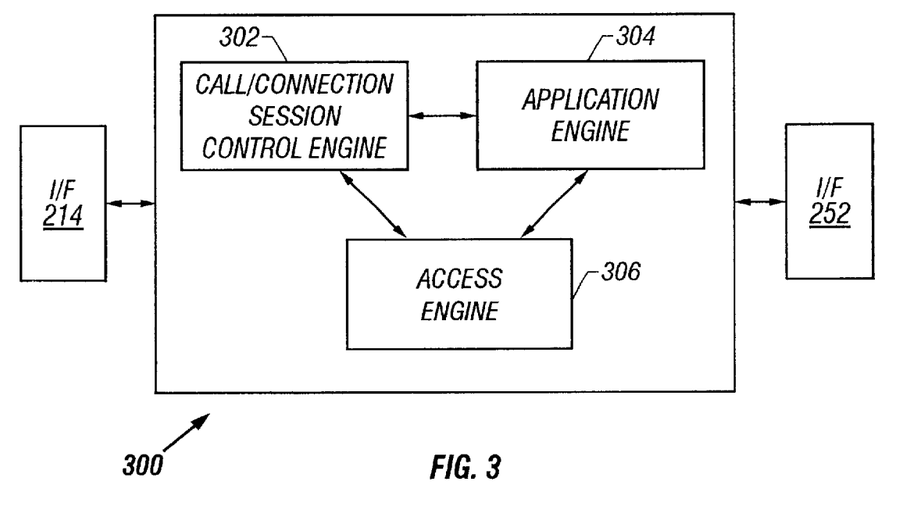
FIG. 3 depicts a functional block diagram of a multimedia call/session engine operable in accordance with the teachings of the present invention.

Referring now to FIG. 3, depicted therein is a high-level functional block diagram of a call/session engine 300 of a multimedia softswitch operable in accordance with the teachings of the present invention. As described in detail hereinabove, both access/transport interfaces 214 and application layer interfaces 252 are available to the call/session engine 300 for effectuating its softswitch functionality. A control engine 302 is responsible for call/session control and connection control (analogous to the traditional call control function or CCF). An application engine 304 is included for application triggering and managing feature/policy interaction with respect to a triggered service application. In addition, the application engine 304 is preferably operable to open suitable APIs for supporting enhanced services. When third-party applications are invoked, the application engine 304 may also provide firewall management and subscriber access management for service selection and initiation. An access engine 306 is operable to effectuate online user authentication and authorization and validate service usage rights. Also, roaming management may be provided by the access engine 306 for subscription retrieval, roaming retrieval and registration negotiation.

Figure 4:
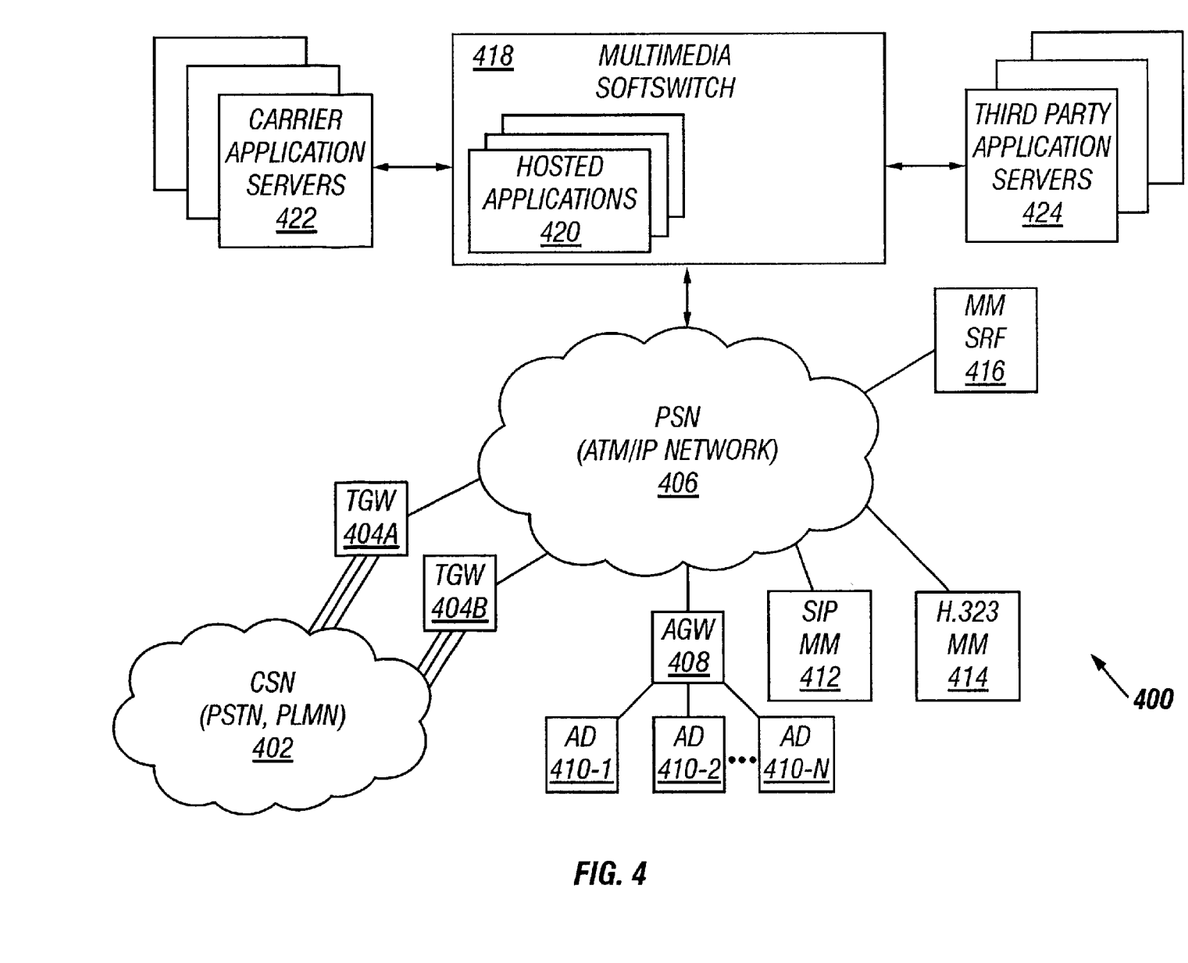
FIG. 4 depicts an exemplary next-generation network capable of multimedia services.

FIG. 4 depicts an exemplary next-generation multimedia network 400 that is capable of providing a plurality of multimedia services in accordance with the teachings of the present invention. For purposes of the present invention, network 400 and its variants and exemplary implementations will be referred to as a "service network." One or more legacy circuit-switched networks (CSNs) 402 such as the Public Switched Telephone Network (PSTN) for wireline telephony and the Public Land Mobile Network (PLMN) for wireless telephony are coupled to one or more packet-switched networks (PSNs) 406 such as the IP-based Internet, ATM-based packet network, etc. Further, the PSN portion 406 may also encompass such other private IP-based networks as, e.g., corporate intranets, enterprise networks, home networks, and the like. Accordingly, in one embodiment, PSN 406 represents an inter-networking network of a combination of such IP networks. A plurality of Trunk Gateways (TGWs), e.g., TGW 404A and TGW 404B, are disposed between the CSN and PSN portions of the network 400 for effectuating the interfacing therebetween. An Access Gateway (AGW) node 408 is coupled to the PSN portion 406 for facilitating access to the network from a plurality of access devices (ADs) 410-1 through 410-N. One or more multimedia-capable SIP terminals 412 and multimedia-capable H.323 terminals 414 are operable to originate and terminate multimedia sessions in conjunction with various multimedia services supported by the network 400.

One or more optional multimedia (MM) Service Resource Function (SRF) nodes, e.g., MM-SRF 416, are coupled to PSN 400 for providing bearer resource functionality for converged voice/data services, protocols to request these services, and open APIs for programming bearer-resource-intensive applications as well as content/announcement files. The MM-SRF node 416 does not set up a bearer path between two parties, however, as there is no such dedicated bearer connection in the context of IP networking. Rather, only a logical connection is established between the parties.

Within the multimedia-based service network framework, some of the functions of the MM-SRF node 416 include the following: (i) operating in the media access/resources plane for bearer services by providing multimedia resource services, (ii) providing standard protocols, (iii) interfacing to AS nodes through a multimedia softswitch (e.g., softswitch 418), and (iv) enabling third-party programmability of bearer services and content/announcements through the open APIs. Those skilled in the art should appreciate that some of these functionalities may be embedded within the multimedia softswitch 418 or be distributed across several MM-capable nodes depending on the integration level of the softswitch.

A plurality of hosted applications 420 are co-located at the multimedia softswitch node 418. The specific type of the applications is dependent on the service architecture implementation and application layering. Some of the exemplary applications may include network announcements (in conjunction with SRF 416), video conferencing, digit collection, unified (multimedia) messaging, media streaming and custom announcements, automatic speech recognition (ASR), text-to-speech (TTS), user verification using multimedia, and various enhanced services such as multimedia call waiting, direct connect services, distinctive call notification, emergency override service, presentation of call party profiles based on multimedia, etc. It should be recognized, in addition, that some of these multimedia services may be provisioned as applications hosted on carrier AS nodes 422 and third-party AS nodes 424, with suitable APIs associated therewith, respectively.

Although the exemplary network embodiment 400 shown in FIG. 4 does not explicitly illustrate SS7 interfaces for effectuating legacy IN/AIN services, those skilled in the art should appreciate that various such SS7 interfaces and SS7-capable signaling gateways (SGWs) may also be appropriately disposed in the network for providing SS7 functionality.

Figure 5:
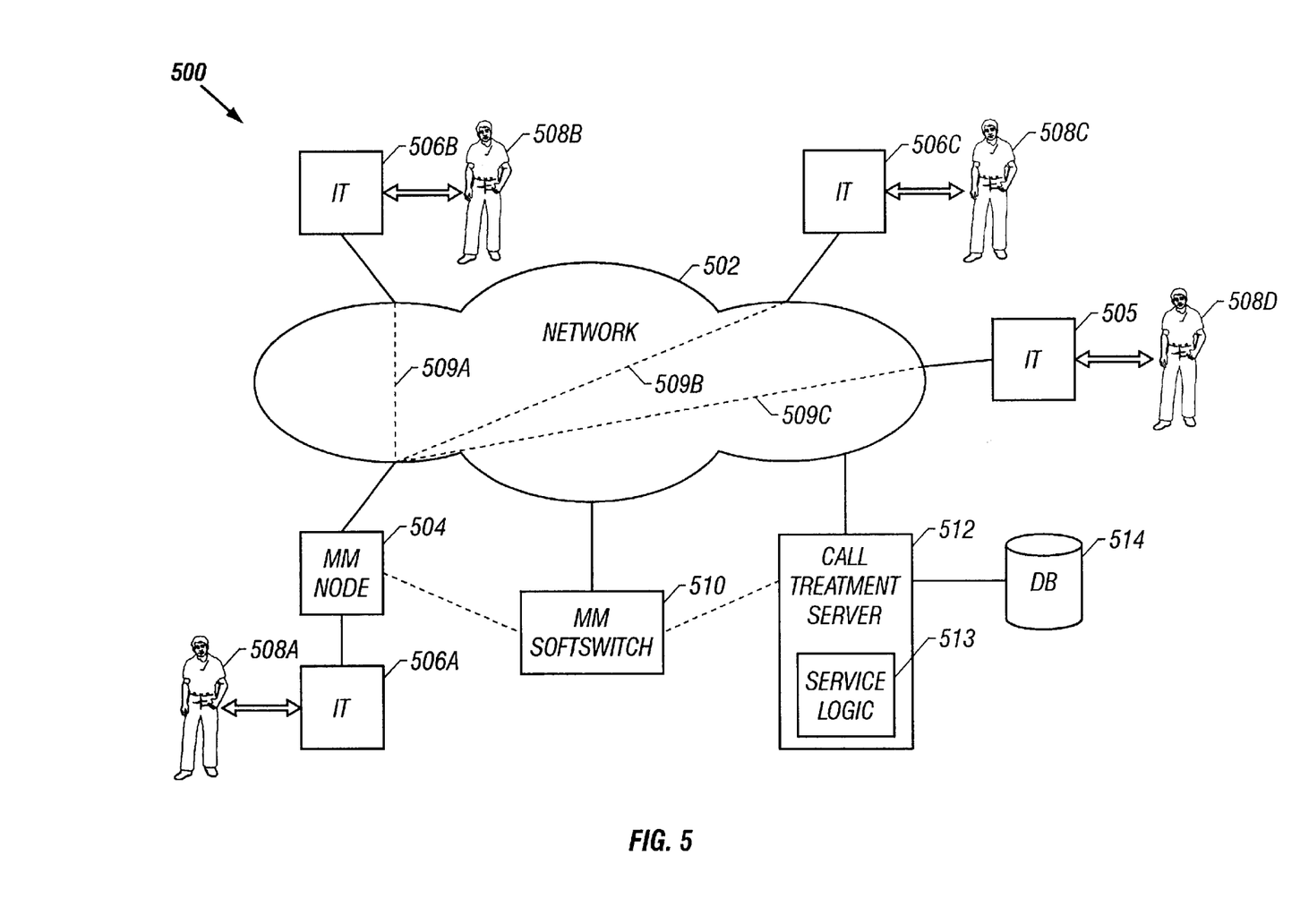
FIG. 5 depicts an exemplary service network which employs a multimedia-based call party profile presentation system and method in accordance with the teachings of the present invention.

Referring now to FIG. 5, depicted therein is an exemplary service network arrangement 500 which employs a multimedia call party profile presentation system and method in a multimedia-capable next-generation network 502 in accordance with the teachings of the present invention. It should be appreciated by those skilled in the art upon reference hereto that in one embodiment, the network 502 may be comprised of a combination of various PSN and CSN portions and their hybrids, including local and inter-carrier network portions. A multimedia node or network element 504 is operable to serve a plurality of subscribers, e.g., subscriber 508A operating a multimedia IT device 506A for originating and/or terminating calls. Similarly, other call parties operating suitable ITs, e.g., call party 508B with IT 506B and call party 508C with IT 506C, are also operably coupled to the network 502.

A softswitch 510 having the multimedia call/session engine functionality as described hereinabove is disposed in the network 502 for call routing and application triggering. Although the softswitch 510 is illustrated as a separate node in this embodiment, it should be recognized that the softswitch functionality may also be provided as part of the serving multimedia node 504. A call treatment server 512 is provided as an application server node coupled to the network 502, wherein suitable multimedia service logic 513 is provided for querying a subscriber presentation profile database. Again, as alluded to hereinabove, it should be apparent that the functionality of the call treatment server node 512 may be distributed or embedded, depending upon the service architecture and application layering.

Continuing to refer to FIG. 5, the call treatment application system of the present invention includes a database environment 514 associated with the call treatment server node 512 via a suitable interface. Various calling party and called party ID/profile information, call notification information, multimedia call treatment criteria, other subscriber features, profiles, restrictions and policies, etc. are stored in the database environment 514. In a presently preferred exemplary embodiment of the present invention, the database environment 514 is capable of being updated by the subscribers as well as the network operator.

Reference numeral 509A refers to a call to be set up or an established call connection in the network 502 between subscriber 508A being served by the multimedia network element 504 and another call party 508B, who may or may not be a subscriber. In similar fashion, reference numeral 509B refers to another call connection between subscriber 508A and at least another call party 508C. Reference numeral 509C refers to yet another call connection between subscriber 508A and a non-subscriber call party 508D. It should be appreciated that a call party may be a calling party (also referred to as a caller) or a called party (also referred to as a callee) with respect to the subscriber 508A. Also, as alluded to in the foregoing, the call parties (or, simply "parties") may or may not be subscribers of the call party profile presentation service of the present invention. Further, some of the terminals operated by the parties, e.g., terminal 505 operated by the party 508D, may or may not be multimedia-compatible. Accordingly, numerous call scenarios may be had with respect to call party profile presentation, e.g., (i) both caller and callee are subscribers and operate multimedia-compatible terminals; (ii) caller is a subscriber, callee a non-subscriber, and both operate multimedia-compatible terminals; (iii) callee is a subscriber, caller a non-subscriber, and caller operates a non-multimedia-compatible terminal, and so on.

Moreover, in some exemplary embodiments, the parties may also have additional service features such as, for example, multiple call waiting (i.e., the capability to wait on multiple incoming calls) and distinctive call notification. Additional information regarding distinctive call notification and multiple call waiting is provided in the following co-pending U.S. patent applications which have been cross-referenced and incorporated by reference hereinabove: (i) "Distinctive Call Notification Service In A Multimedia-Capable Network," filed May 31, 2001, Ser. No. 09/871,079 in the name(s) of: Babu V. Mani; and (ii) "Call Waiting Service In A Multimedia-Capable Network," filed May 31, 2001 Ser. No. 09/871,042, in the name(s) of: Babu V. Mani.

Figure 6:
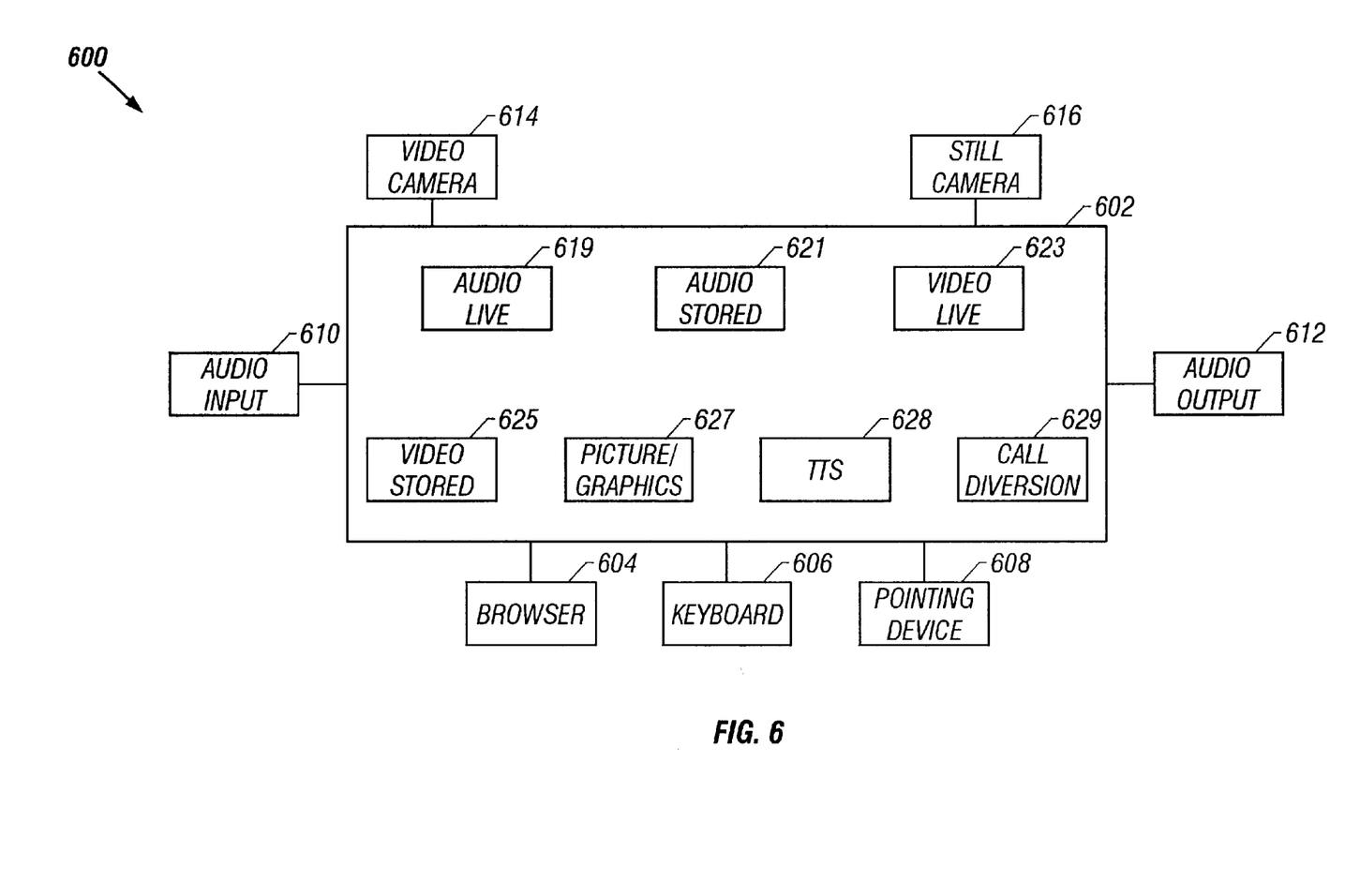
FIG. 6 depicts an exemplary multimedia interface with browser navigation for effectuating multimedia calls and call party profile presentation in accordance with the teachings of the present invention.

FIG. 6 depicts an exemplary multimedia interface 600 with browser navigation capability that is operable with multimedia-capable terminals for effectuating multimedia calls and call party profile presentation in accordance with the teachings of the present invention. A display 602 is operable to present a graphic user interface (GUI) with a plurality of call-oriented icons which can be activated via drag-and-drop interaction under the control of a browser client 604 running on a multimedia terminal, e.g., IT 506A depicted in FIG. 5. At least a portion of the display 602 may be utilized for presenting video/photo indicia of the call party to the subscriber. A keyboard or keypad 606 and a cursor pointing device 608 (such as, e.g., a mouse or trackball, and their equivalents) are provided for facilitating the drag-and-drop interaction between the subscriber and the interface. Suitable audio input devices 610 and audio output devices 612 are associated with the interface 600 for effectuating live speech responses. A digital video camera 614 and a still camera 616 are also included for capturing live video and still photographs of the subscriber in order to provide live images as multimedia responses to a call party engaged in a session with the subscriber.

If call waiting (CW) notification features are available to the subscriber, a plurality of waiting callers may be presented on the display 602 as suitable "icons" (not shown in this FIG.). It should be recognized that these icons may comprise audio clip icons, image icons, animation graphics, flashing text messages, et cetera, associated with the waiting callers.

The exemplary multimedia interface 600 also includes a plurality of call party profile presentation icons to indicate the types of call party profiles selectable by the subscriber with respect to a call between a call party and the subscriber. Depending on which icon is activated, the subscriber selects the particular call party profile portion, which can comprise audio, video, text, etc. associated with the call party, to be presented or delivered to the subscriber. As can be appreciated, these audio, video, text files stored in the profile database uniquely identify the subscribing call party and may be referred to as call party profile indicia.

An Audio Live icon 619 is operable, when selected, to enable the subscriber to receive a live speech profile indicium associated with the call party. Similarly, Audio Stored icon 621 is available for selecting a multimedia call party profile that includes a stored audio clip to be transmitted to the subscriber. Video Live icon 623 and Video Stored 625 are operable to indicate the selection of live video and stored video profile indicia, respectively. Also, an exemplary Picture/Graphics icon 627 may be provided for selecting such call party indicia as animation images, still photographic images, live or stored, and the like. A TTS icon 628 is operable, when activated, to convert text messages to speech and vice versa. Further, a Call Diversion icon 629 is provided so as to enable the subscriber to divert an incoming call to a voice mail box, answering service, or a different terminal, etc.

Figure 7:
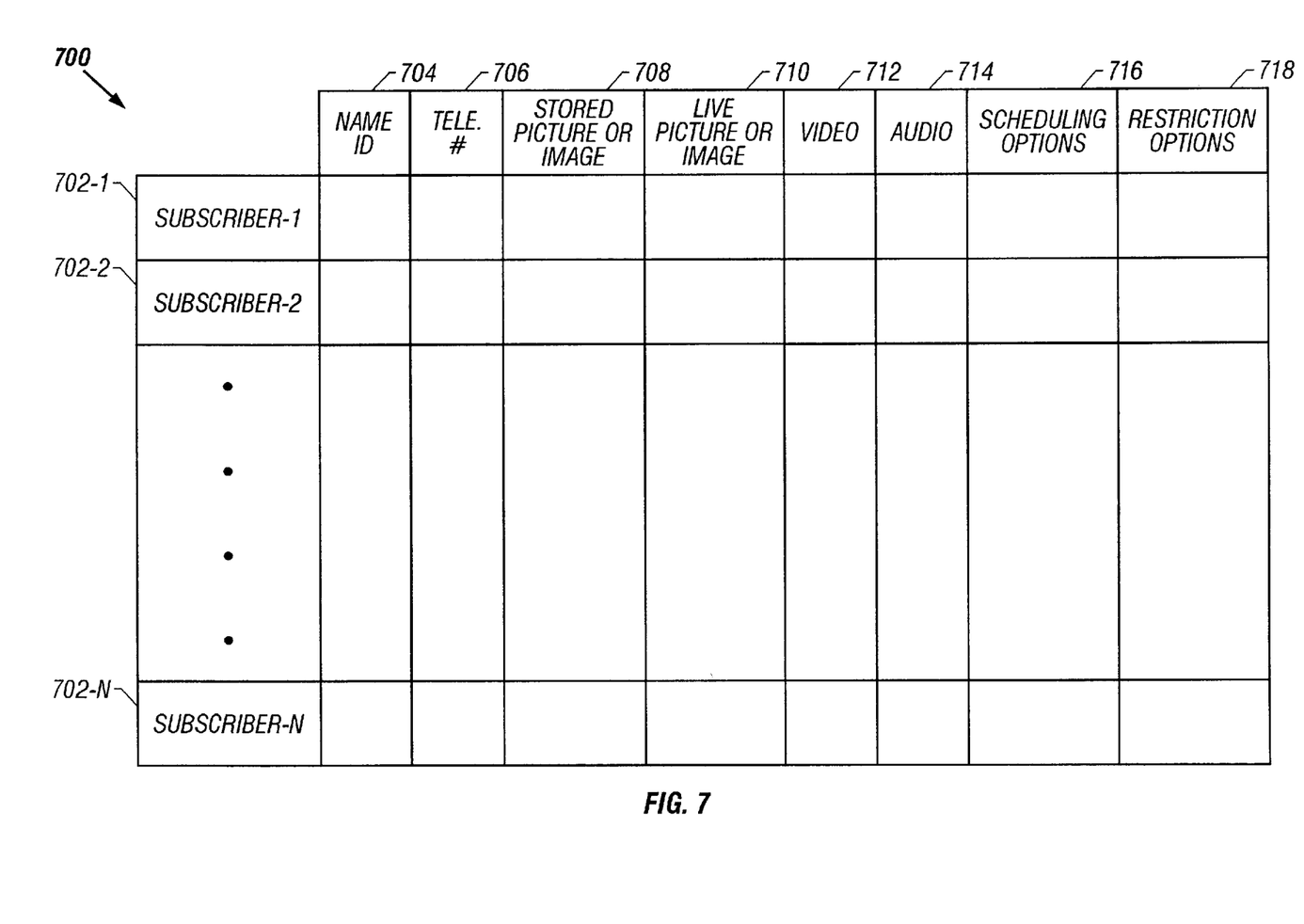
FIG. 7 depicts an exemplary embodiment of a party presentation profile.

Referring now to FIG. 7, depicted therein is an exemplary embodiment of a presentation profile 700 for use in the call party profile presentation service of the present invention. It should be apparent that the database environment 514 (shown in FIG. 5) is populated with subscriber profiles such as the presentation profile 700, wherein subscribers may function as callers or callees with respect to a particular call. A plurality of subscribers, reference numerals 702-1 through 702-N, are identified in the presentation profile database 700. Each subscriber's profile record is comprised of a plurality of portions specifying the types of profile indicia the subscriber can present to the other party either on request, upon call acceptance, or call presentation, during call setup or at any time during the call. In the exemplary embodiment depicted in FIG. 7, the following profile indicia are illustrated: name or ID 704, multimedia telephone number 706, stored picture/image 708, live picture/image 710, video 712, and audio 714. By setting appropriate flags and the like, a particular profile option may be activated for a subscriber, wherein the indicia associated therewith may be localized elsewhere in the database environment. Various scheduling options 716 may also be provided as part of the exemplary presentation profile 700 to specify time-dependent delivery of the indicia. For example, a subscriber may select particular days or times for delivering video profile indicia 712, for audio profile indicia 714, for stored picture indicia 708, et cetera. Also, various restriction options 718 may be provided as part of the profile records that would allow the subscribers to block the delivery of the various profile indicia based on time, place, selective call list, or other criteria.

Although not explicitly shown in FIG. 7, additional profile indicia may be included in other exemplary embodiments of the present invention. For example, a party's nickname, age group, gender, language capabilities, hobbies, etc. may be provided so as to customize profile presentation depending on the context, for instance, shopping, leisure, research, obtaining insurance/interest rate quotes, etc.

Those skilled in the art should realize upon reference hereto that the presentation profile 700 described herein is illustrative only. Accordingly, both the contents and specific implementation of a subscriber profile database may vary depending upon the objectives of a particular application. It should therefore be recognized that the scope of the present invention is not circumscribed by the specifics of a subscriber profile database in any manner.

Figure 8:
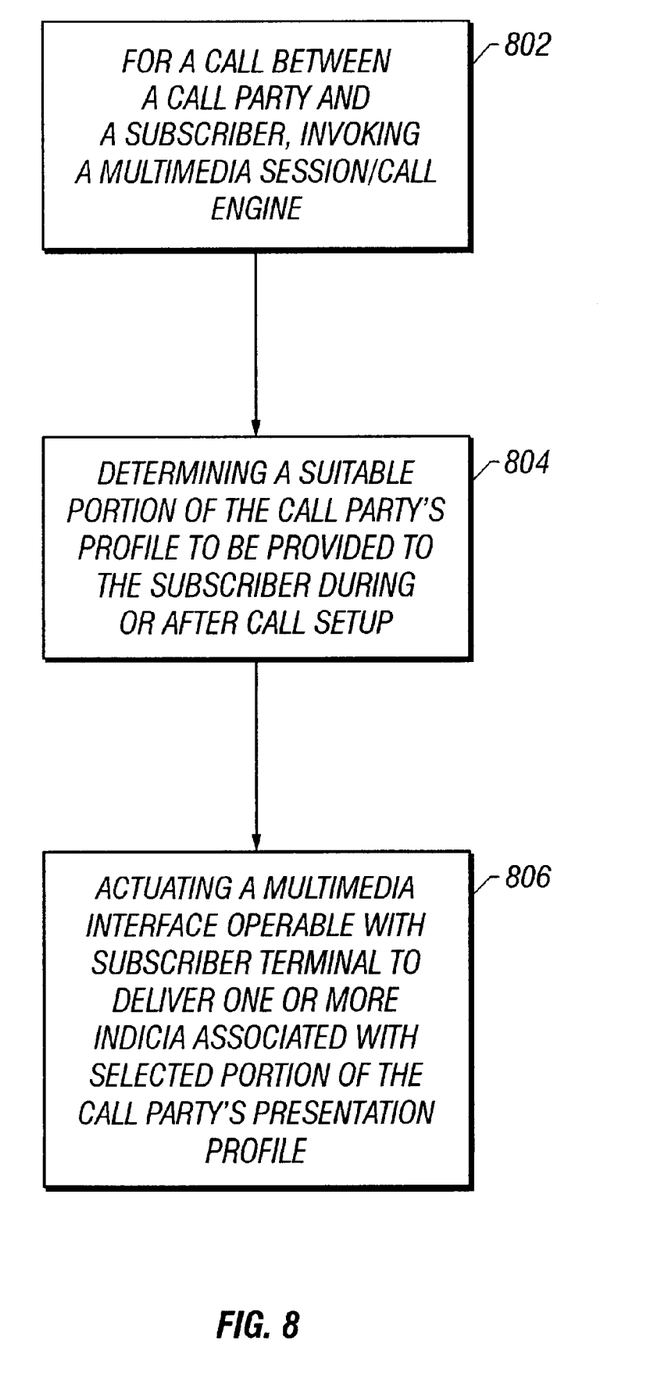
FIG. 8 is a flow chart of the steps involved in an exemplary call party profile presentation method of the present invention.

As alluded to hereinabove, numerous call scenarios are possible within the context of delivery of a call party profile because of the various combinations resulting from the subscription status and service features of the callers, callees and the capabilities of their terminals. FIG. 8 is a flow chart of the steps involved in an exemplary high-level call party profile presentation scheme of the present invention. With respect to a call between a call party and a subscriber, a multimedia call session engine is invoked by a serving network element disposed in a service network structure (such as, e.g., service network arrangement 500 depicted in FIG. 5) to launch a call treatment application when the call party profile is to be presented to the subscriber (step 802). A determination is made thereafter to ascertain an appropriate portion of the call party's profile to be provided to the subscriber depending upon subscriber selection, applicable call party profile restrictions, et cetera (step 804). As pointed out in the foregoing discussion, presentation of the call party profile can take place at call setup or any time during the call upon subscriber or call party request. Further, the call party profile may be delivered as part of call presentation or call acceptance. A multimedia interface operable with the subscriber terminal is actuated accordingly to deliver one or more indicia (i.e., a picture, audio/video clips, and the like) associated with the selected call party presentation profile portions (step 806).

Figure 9A:
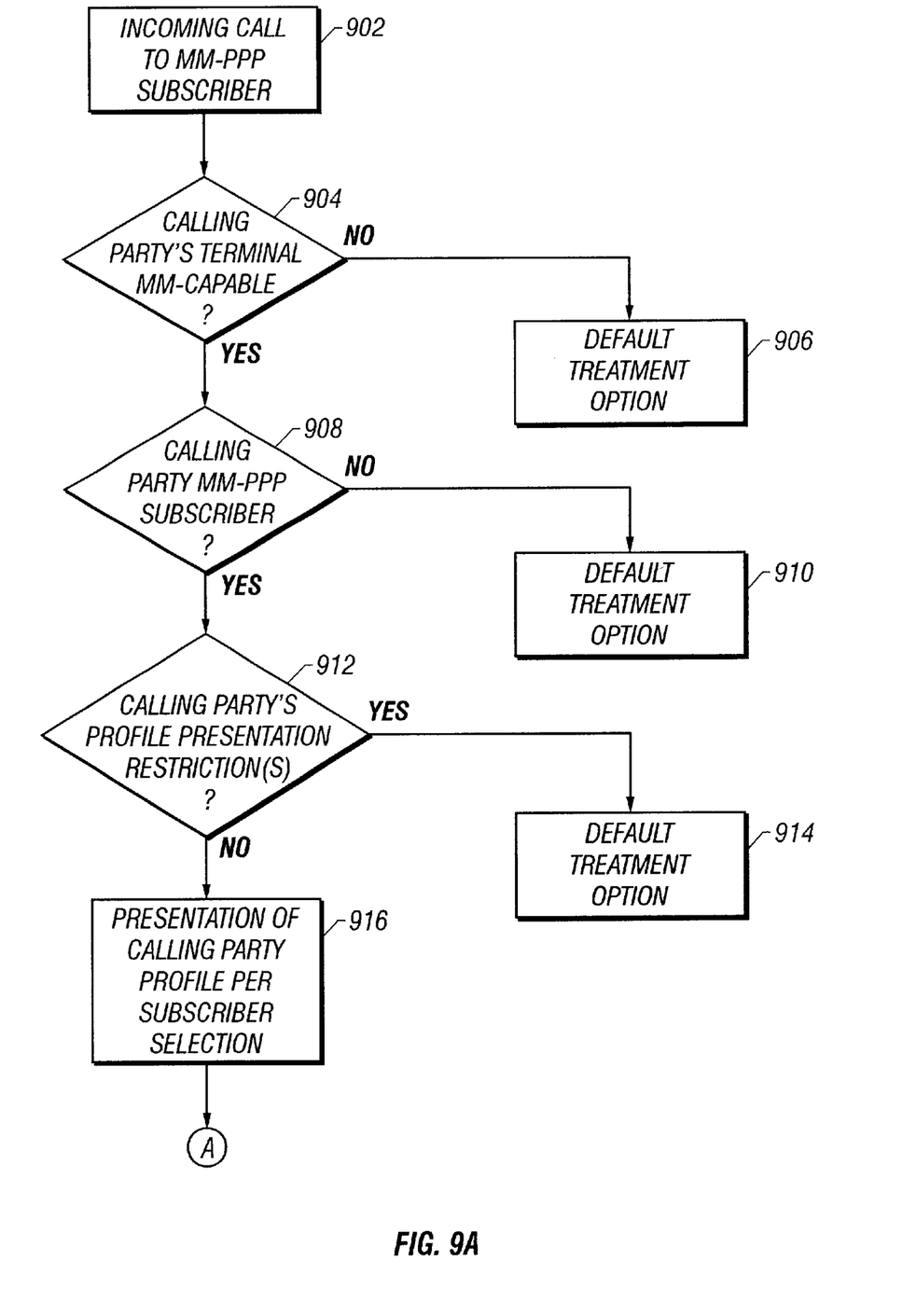
FIGS. 9A and 9B depict the steps involved in select exemplary call party profile presentation scenarios in accordance with the teachings of the present invention.
Figure 9B:
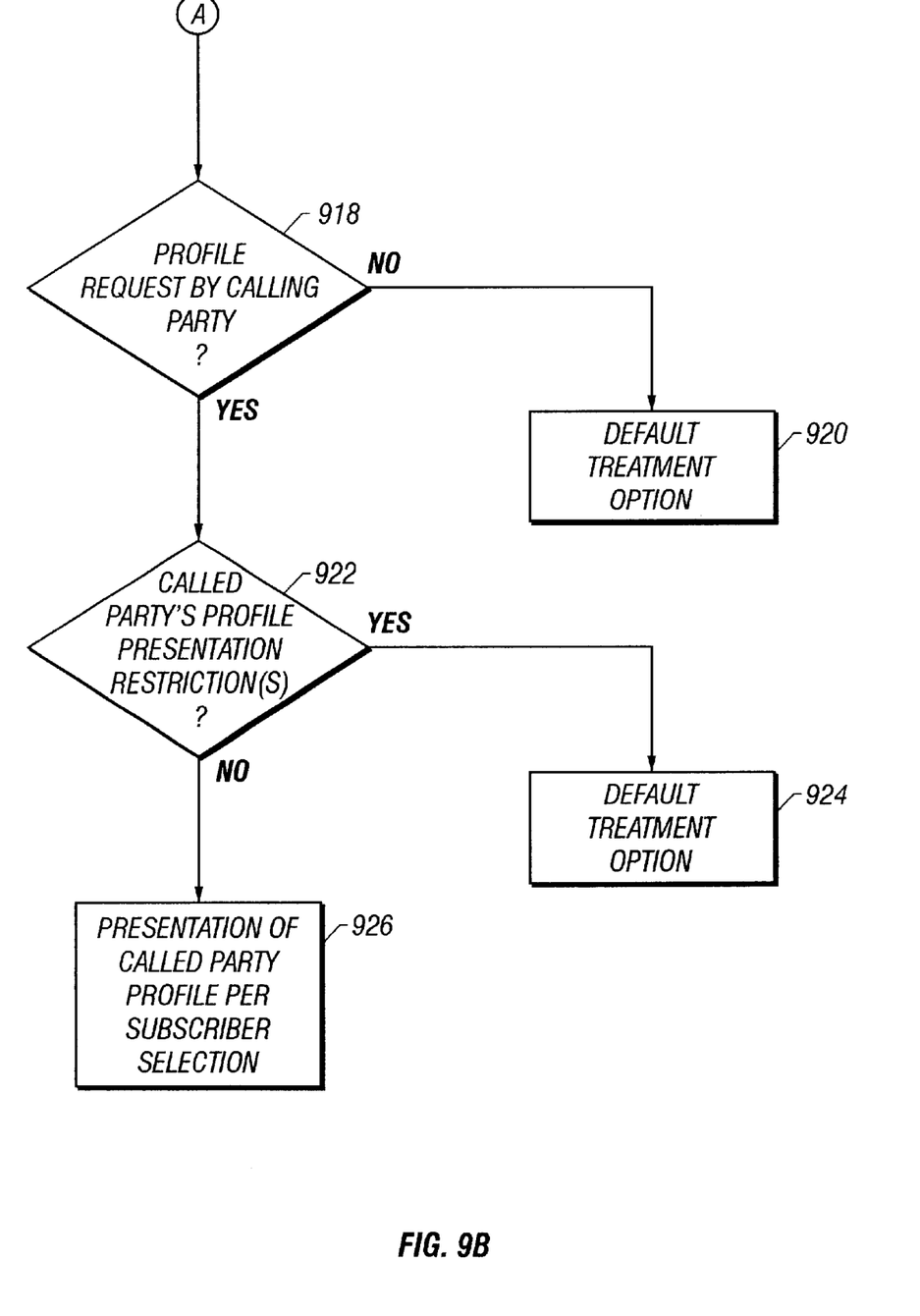

FIGS. 9A and 9B depict the steps involved in select exemplary call party profile presentation scenarios in accordance with the teachings of the present invention. Upon receiving an incoming call with respect to a callee who is a subscriber of the multimedia-based party profile presentation service (MM-PPP service) (step 902), an appropriate call treatment application is launched by the multimedia session engine. If the calling party's terminal is not multimedia-capable (decision block 904), a default treatment may be available (step 906), wherein a non-multimedia profile (i.e., a generic "name" or telephone number analogous to the conventional caller ID service) may be presented to the callee. Also, in other implementations, a network-maintained default call party profile may be provided in the absence of a call party maintained profile. In addition, where the network maintains default profile, the subscriber may have the option to request such a profile for the party at the other end. This feature is particularly advantageous when the subscriber is suspicious of a presented call party profile. Another related option is to restrict the amount of information that the subscriber wishes to receive (even where there is more information is available), by way of (a) summary profile presentation (by default) and (b) expanded profile presentation (if available and upon explicit request).

Continuing to refer to FIG. 9A, another determination is made whether the calling party is a subscriber having a suitable call party presentation profile (decision block 908). If not, a predetermined default treatment may be provided with respect to the presentation of the caller profile (step 910). In an exemplary implementation, caller name and/or terminal number may be presented to the callee.

If there exist no applicable restrictions with respect to the calling party's presentation profile (decision block 912), appropriate profile indicia are presented to the callee per subscriber selection (step 916). On the other hand, if the selected presentation profile portions are restricted for whatever reason, a predetermined default treatment may be accorded with respect to the incoming call (step 914). For example, an indication may be provided to the subscriber that the call profile option selected is unavailable for delivery. Thereafter, the subscriber may choose a different format for profile delivery or not accept the call. If the call has already been established, the subscriber may select to terminate the call if the requested call party profile is unavailable.

Referring now to FIG. 9B in particular, upon presentation of the calling party's profile to the subscriber (step 916), the calling party can request the subscriber's profile in suitable media (decision block 918). If there is no such request made, a default treatment (i.e., continuing with the established call) may take place (step 920). If the called party has applicable profile presentation restrictions (decision block 922), a default treatment option including, e.g., terminating the call by the calling party, may be effectuated (step 924). Otherwise, indicia relating to the called party's presentation profile are delivered to the calling party as per calling party's selection (step 926).

Based upon the foregoing Detailed Description, it should be readily apparent that the present invention advantageously provides an enhanced call party profile/ID presentation service using multimedia within the context of a next-generation network. By architecting the service as part of a decoupled application layer with open protocols and APIs, not only can service interoperability with different network elements and platforms be ensured, but service rollout can be streamlined for faster delivery. Furthermore, the call party profile presentation service of the present invention provides several advancements and improvements over the conventional caller ID schemes. For example, numerous enhanced service features may be implemented to increase subscriber control over the profile options, restrictions, et cetera, by providing programmable calling party and called party presentation profiles, wherein different indicia can be adapted to the selected call media. In a business context, as soon as a call is established, the customer profile can be made available to the business operator, thereby eliminating the need to query the customer's name, address, and the like. Also, the likelihood of having to deal with potential nuisance calls is significantly reduced in the practice of the present invention. Further, because the subscriber can select different profile delivery options coupled with scheduling options (such as time of day, specific calling lists, etc.), profiles may be customized for different applications, e.g., friends, family members, business acquaintances, call party locations, et cetera. Also, additional context-based customization is possible by including such "demographic" data as names, nicknames, age groups, hobbies, gender, language capabilities, etc. in the presentation profiles.

Moreover, the service architecture allows both calling parties as well as called parties to be subscribers. A calling party is a subscriber in order to receive a called party profile. Similarly, a called party is operable as a subscriber to receive the calling party profile. It is therefore advantageous to the network operators to allow both calling and called parties to maintain their profiles so that revenues flow from subscription at both ends when one party obtains the profile from the other.

It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims.

What is claimed is:

1. A call party profile presentation method for use in a multimedia-capable network, comprising the steps:

with respect to a call between a call party and a subscriber, invoking a multimedia session engine to launch a call treatment application for said subscriber;

determining by said call treatment application at least a portion of said call party's presentation profile to be provided to said subscriber; and actuating at least a portion of a multimedia interface operable with said subscriber's terminal for delivering an indicium associated with said at least a portion of said call party's presentation profile to said subscriber, wherein said indicium is operable to identify said call party.

2. The call party profile presentation method for use in a multimedia-capable network as set forth in claim 1, wherein said indicium is selected from the group consisting of a name, a photograph, a video clip, an audio clip, a graphic image, a nickname, an age group, and gender, each of which being associated with said call party.

3. The call party profile presentation method for use in a multimedia-capable network as set forth in claim 2, wherein said call party comprises one of a calling party and a called party.

4. The call party profile presentation method for use in a multimedia-capable network as set forth in claim 3, wherein said indicium is delivered to said subscriber during one of a call setup and a call session.

5. The call party profile presentation method for use in a multimedia-capable network as set forth in claim 4, further comprising the steps:

determining if said at least a portion of said call party's presentation profile is restricted; and if so, providing an indication to said subscriber that said indicium associated with said at least a portion of said call party's presentation profile is unavailable for delivery.

6. The call party profile presentation method for use in a multimedia-capable network as set forth in claim 4, further comprising the steps:

upon delivering said indicium associated with said at least a portion of said call party's presentation profile to said subscriber, effectuating a profile request by said call party to obtain at least a portion of said subscriber's presentation profile; and responsive to said effectuating step, actuating at least a portion of a multimedia interface operable with said call party's terminal for delivering an indicium associated with said at least a portion of said subscriber's presentation profile to said call party.

7. The call party profile presentation method for use in a multimedia-capable network as set forth in claim 6, wherein said indicium associated with said at least a portion of said subscriber's presentation profile is selected from the group consisting of a name, a photograph, a video clip, an audio clip, a graphic image, a nickname, an age group, and gender, each of which being identified with said subscriber.

8. A call party profile presentation system for use in a multimedia-capable network, comprising:
    means for invoking a multimedia session engine to launch a call treatment application for a subscriber with respect to a call between a call party and said subscriber;
    database means operable to store presentation profiles for said call party and said subscriber;
    service logic means associated with said call treatment application for determining at least a portion of said call party's presentation profile to be provided to said subscriber by interacting with said database means; and
    means for actuating at least a portion of a multimedia interface operable with said subscriber's terminal for delivering an indicium associated with said at least a portion of said call party's presentation profile to said subscriber, wherein said indicium is operable to identify said call party.

9. The call party profile presentation system for use in a multimedia-capable network as set forth in claim 8, wherein said indicium is selected from the group consisting of a name, a photograph, a video clip, an audio clip, a graphic image, a nickname, an age group, and gender, each of which being associated with said call party.

10. The call party profile presentation system for use in a multimedia-capable network as set forth in claim 9, wherein said call party comprises one of a calling party and a called party.

11. The call party profile presentation system for use in a multimedia-capable network as set forth in claim 10, wherein said indicium is operable to be delivered to said subscriber during one of a call setup and a call session.

12. The call party profile presentation system for use in a multimedia-capable network as set forth in claim 11, further comprising:
    means for determining if said at least a portion of said call party's presentation profile is restricted; and
    means for providing an indication to said subscriber that said indicium associated with said at least a portion of said call party's presentation profile is unavailable for delivery.

13. The call party profile presentation system for use in a multimedia-capable network as set forth in claim 11, further comprising:
    means for effectuating a profile request by said call party to obtain at least a portion of said subscriber's presentation profile; and
    means for actuating at least a portion of a multimedia interface operable with said call party's terminal for delivering an indicium associated with said at least a portion of said subscriber's presentation profile to said call party.

14. The call party profile presentation system for use in a multimedia-capable network as set forth in claim 13, wherein said indicium associated with said at least a portion of said subscriber's presentation profile is selected from the group consisting of a name, a photograph, a video clip, an audio clip, a graphic image, a nickname, an age group, and gender, each of which being identified with said subscriber.

15. The call party profile presentation system for use in a multimedia-capable network as set forth in claim 11, wherein said presentation profiles are subscriber-maintainable.

16. A computer-accessible medium operable with a network element disposed in a multimedia-capable next-generation network, said computer-accessible medium carrying a sequence of instructions which, when executed by at least one processing entity associated with said multimedia-capable next-generation network, cause the following steps to be performed:
    with respect to a call between a call party and a subscriber, invoking a multimedia session engine to launch a call treatment application for said subscriber;
    determining by said call treatment application at least a portion of said call party's presentation profile to be provided to said subscriber; and
    actuating at least a portion of a multimedia interface operable with said subscriber's terminal for delivering an indicium associated with said at least a portion of said call party's presentation profile to said subscriber, wherein said indicium is operable to identify said call party.

17. The computer-accessible medium operable with a network element disposed in a multimedia-capable next-generation network as set forth in claim 16, wherein said indicium is selected from the group consisting of a name, a photograph, a video clip, an audio clip, a graphic image, a nickname, an age group, and gender, each of which being associated with said call party.

18. The computer-accessible medium operable with a network element disposed in a multimedia-capable next-generation network as set forth in claim 17, wherein said call party comprises one of a calling party and a called party.

19. The computer-accessible medium operable with a network element disposed in a multimedia-capable next-generation network as set forth in claim 18, wherein said indicium is operable to be delivered to said subscriber during one of a call setup and a call session.

20. The computer-accessible medium operable with a network element disposed in a multimedia-capable next-generation network as set forth in claim 19 including an additional sequence of instructions for performing the following steps:
    determining if said at least a portion of said call party's presentation profile is restricted; and
    if so, providing an indication to said subscriber that said indicium associated with said at least a portion of said call party's presentation profile is unavailable for delivery.

21. The computer-accessible medium operable with a network element disposed in a multimedia-capable next-generation network as set forth in claim 19 including an additional sequence of instructions for performing the following steps:
    upon delivering said indicium associated with said at least a portion of said call party's presentation profile to said subscriber, effectuating a profile request by said call party to obtain at least a portion of said subscriber's presentation profile; and
    responsive to said effectuating step, actuating at least a portion of a multimedia interface operable with said call party's terminal for delivering an indicium associated with said at least a portion of said subscriber's presentation profile to said call party.

22. The computer-accessible medium operable with a network element disposed in a multimedia-capable next-generation network as set forth in claim 21, wherein said indicium associated with said at least a portion of said subscriber's presentation profile is selected from the group consisting of a name, a photograph, a video clip, an audio clip, a graphic image, a nickname, an age group, and gender, each of which being identified with said subscriber.

* * * * *